United States Patent
Maheshwari

(10) Patent No.: US 8,724,548 B2
(45) Date of Patent: May 13, 2014

(54) COUNTER CHECK PROCEDURE FOR PACKET DATA TRANSMISSION

(75) Inventor: Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 13/090,943

(22) Filed: Apr. 20, 2011

(65) Prior Publication Data

US 2012/0099525 A1 Apr. 26, 2012

Related U.S. Application Data

(60) Provisional application No. 61/327,033, filed on Apr. 22, 2010.

(51) Int. Cl.
*H04W 56/00* (2009.01)
*H04W 24/00* (2009.01)

(52) U.S. Cl.
USPC ........................................................ 370/328

(58) Field of Classification Search
CPC ..... H04W 12/02; H04W 12/04; H04W 12/00; H04L 2209/80; H04L 63/068
USPC .................................. 370/310, 328, 329, 331
See application file for complete search history.

(56) References Cited

U.S. PATENT DOCUMENTS

| | | | | |
|---|---|---|---|---|
| 5,457,680 A * | 10/1995 | Kamm et al. | | 370/332 |
| 6,356,951 B1 * | 3/2002 | Gentry, Jr. | | 709/250 |
| 6,728,529 B2 * | 4/2004 | Kuo et al. | | 455/411 |
| 6,765,885 B2 * | 7/2004 | Jiang et al. | | 370/328 |
| 6,925,298 B2 * | 8/2005 | Ho | | 455/411 |
| 6,987,981 B2 * | 1/2006 | Kuo | | 455/502 |
| 7,006,628 B2 * | 2/2006 | Garstin et al. | | 380/42 |
| 7,054,630 B2 * | 5/2006 | Nagpal et al. | | 455/434 |
| 7,068,636 B2 * | 6/2006 | Kuo | | 370/338 |
| 7,171,224 B2 * | 1/2007 | Sarkkinen et al. | | 455/502 |
| 7,725,709 B2 * | 5/2010 | Naslund et al. | | 713/151 |
| 7,912,075 B1 * | 3/2011 | Holland et al. | | 370/401 |
| 8,189,586 B2 * | 5/2012 | Pelletier et al. | | 370/392 |
| 8,208,498 B2 * | 6/2012 | Kitazoe et al. | | 370/509 |
| 8,320,333 B2 * | 11/2012 | Mildh et al. | | 370/331 |
| 8,442,233 B2 * | 5/2013 | Mildh | | 380/272 |
| 8,462,015 B2 * | 6/2013 | Picard | | 340/870.02 |

(Continued)

FOREIGN PATENT DOCUMENTS

EP 1928130 A2 6/2008
WO 2007130637 11/2007

OTHER PUBLICATIONS

International Search Report and Written Opinion—PCT/US2011/033670- ISA/EPO—Aug. 4, 2011.

*Primary Examiner* — Chi Pham
*Assistant Examiner* — Robert Lopata
(74) *Attorney, Agent, or Firm* — Nerrie M. Zohn

(57) ABSTRACT

A counter synchronization process is described that is event driven rather than conducted on a periodic basis. A receiving device, which may be a user equipment (UE) or a base station, monitors received data packets to detect a rollover of a packet data sequence number in successive data packets. When the sequence number rollover is detected, the receiving device increments the variable data portion of the deciphering key stored in memory. Also in response to this detected rollover event, the receiving device transmits a synchronization message to the source device.

24 Claims, 8 Drawing Sheets

(56) References Cited

U.S. PATENT DOCUMENTS

| | | | |
|---|---|---|---|
| 2002/0126629 A1* | 9/2002 | Jiang et al. | 370/328 |
| 2003/0036377 A1* | 2/2003 | Kuo et al. | 455/411 |
| 2003/0091048 A1* | 5/2003 | Jiang | 370/392 |
| 2003/0206534 A1* | 11/2003 | Wu | 370/328 |
| 2008/0137652 A1* | 6/2008 | Herrmann et al. | 370/389 |
| 2009/0316904 A1* | 12/2009 | Klingenbrunn et al. | 380/274 |
| 2010/0202613 A1* | 8/2010 | Ray et al. | 380/270 |
| 2010/0265912 A1* | 10/2010 | Mildh et al. | 370/331 |
| 2010/0284535 A1 | 11/2010 | Sharma et al. | |
| 2012/0099525 A1* | 4/2012 | Maheshwari | 370/328 |
| 2012/0106538 A1* | 5/2012 | Al et al. | 370/350 |
| 2013/0236017 A1* | 9/2013 | Mildh | 380/270 |

* cited by examiner

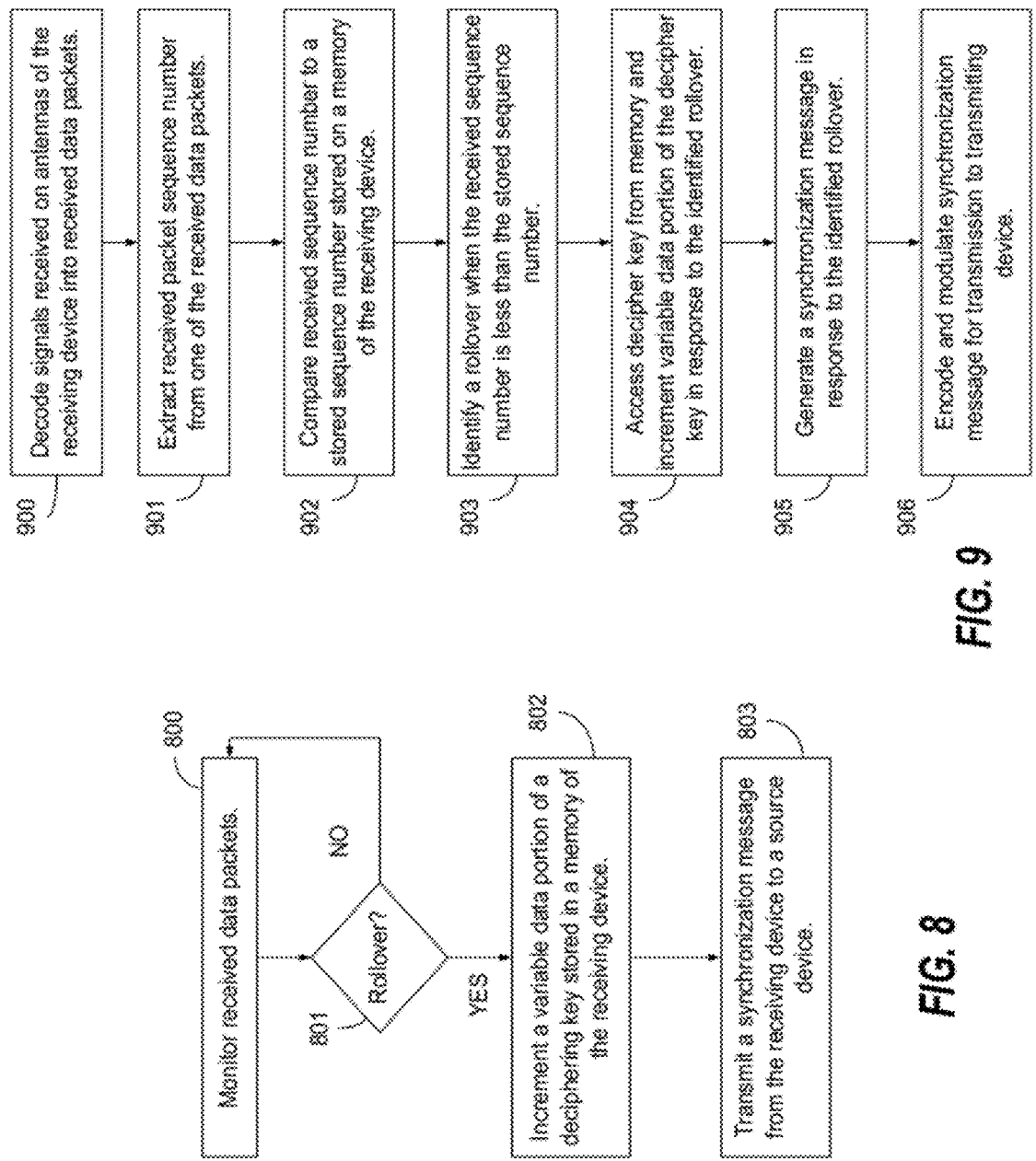

COUNTER CHECK PROCEDURE FOR PACKET DATA TRANSMISSION

CROSS-REFERENCE TO RELATED APPLICATIONS

This application claims the benefit of U.S. Provisional Patent Application No. 61/327,033, entitled, "COUNTER CHECK PROCEDURE FOR PACKET DATA TRANSMISSION", filed on Apr. 22, 2010, which is expressly incorporated by reference herein in its entirety.

BACKGROUND

1. Field

Aspects of the present disclosure relate generally to wireless communication systems, and more particularly, to counter check procedures for packet data transmission.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to counter synchronization. Instead of operating a counter check periodically, the presently disclosed aspect operates an event driven synchronization. A receiving device, which may be a user equipment (UE) or a base station, monitors received data packets to detect a rollover of a packet data sequence number in successive data packets. When the sequence number rollover is detected, the receiving device increments the variable data portion of the deciphering key stored in memory. Also in response to this detected rollover event, the receiving device transmits a synchronization message to the source device.

In one aspect of the disclosure, a method includes detecting a rollover of a packet data sequence number in successive data packets of a transmission received by a receiving device and incrementing a variable data portion of a deciphering key stored in a memory of the receiving device, in response to the rollover. The deciphering key is made up from the variable data portion and the packet data sequence number. The method also includes transmitting a synchronization message from the receiving device to a source device.

In an additional aspect of the disclosure, a receiving device includes means for detecting a rollover of a packet data sequence number in successive data packets of a transmission received by the receiving device and means for incrementing a variable data portion of a deciphering key stored in a memory of the receiving device, in response to the rollover. The deciphering key is generated using the variable data portion and the packet data sequence number. The receiving device also includes means for transmitting a synchronization message from the receiving device to a source device.

In an additional aspect of the disclosure, a computer program product has a computer-readable medium having program code recorded thereon. This program code includes code to detect a rollover of a packet data sequence number in successive data packets of a transmission received by a receiving device, code to increment a variable data portion of a deciphering key stored in a memory of the receiving device, in response to the rollover, and code to transmit a synchronization message from the receiving device to a source device. The deciphering key includes the variable data portion and the packet data sequence number, In an additional aspect of the disclosure, a receiving device includes at least one processor and a memory coupled to the processor. The processor is configured to detect a rollover of a packet data sequence number in successive data packets of a transmission received by a receiving device, to increment a variable data portion of a deciphering key stored in a memory of the receiving device, in response to the rollover, and to transmit a synchronization message from the receiving device to a source device. The deciphering key is made up of the variable data portion and the packet data sequence number,

BRIEF DESCRIPTION OF THE DRAWINGS

FIG. 8 is a functional block diagram illustrating example blocks executed to implement one aspect of the present disclosure.

FIG. 9 is a functional block diagram illustrating example blocks executed to implement one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
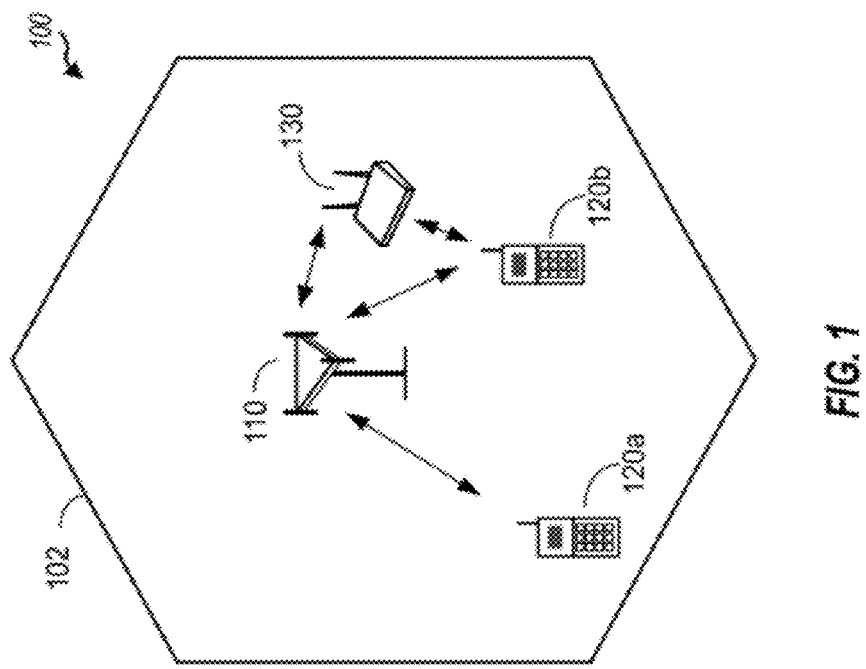
FIG. 1 is a block diagram conceptually illustrating an example of a mobile communication system.

FIG. 1 shows a portion of a wireless network 100 for communication, which may be an LTE-A network. The portion of the wireless network 100 illustrates a single cell having a cell coverage area 102 served by an eNB 110. UEs within the cell coverage area 102 establish and maintain communications with the eNB 110. Wireless network 100 may include many other such cells served by additional eNBs. As illustrated, UEs 120a and 120b are located within cell coverage area 102 and are serviced by the eNB 110.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

UEs, such as UEs 120a and 120b, are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, or 20 MHz, respectively.

Figure 2:
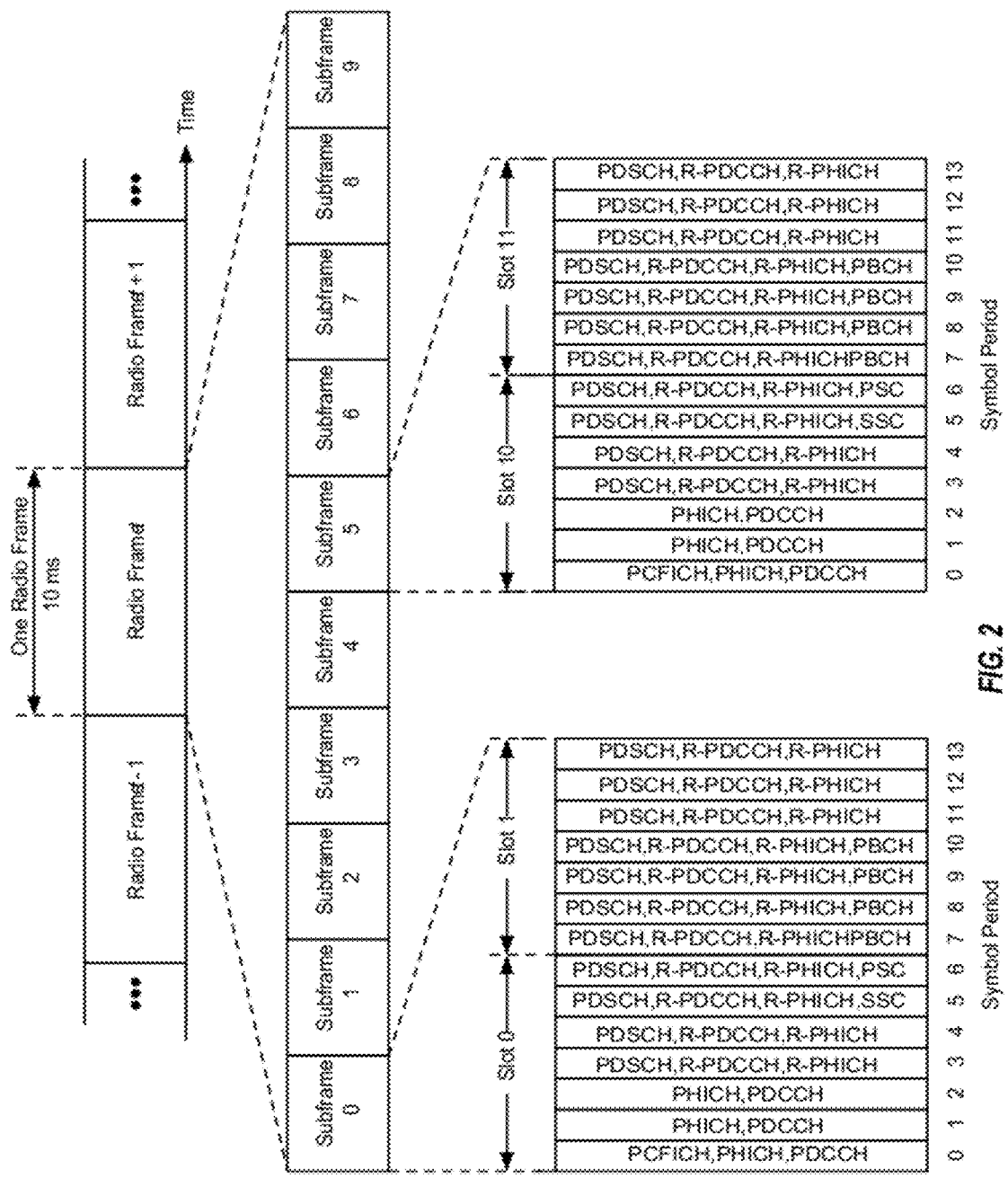
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

Figure 3:
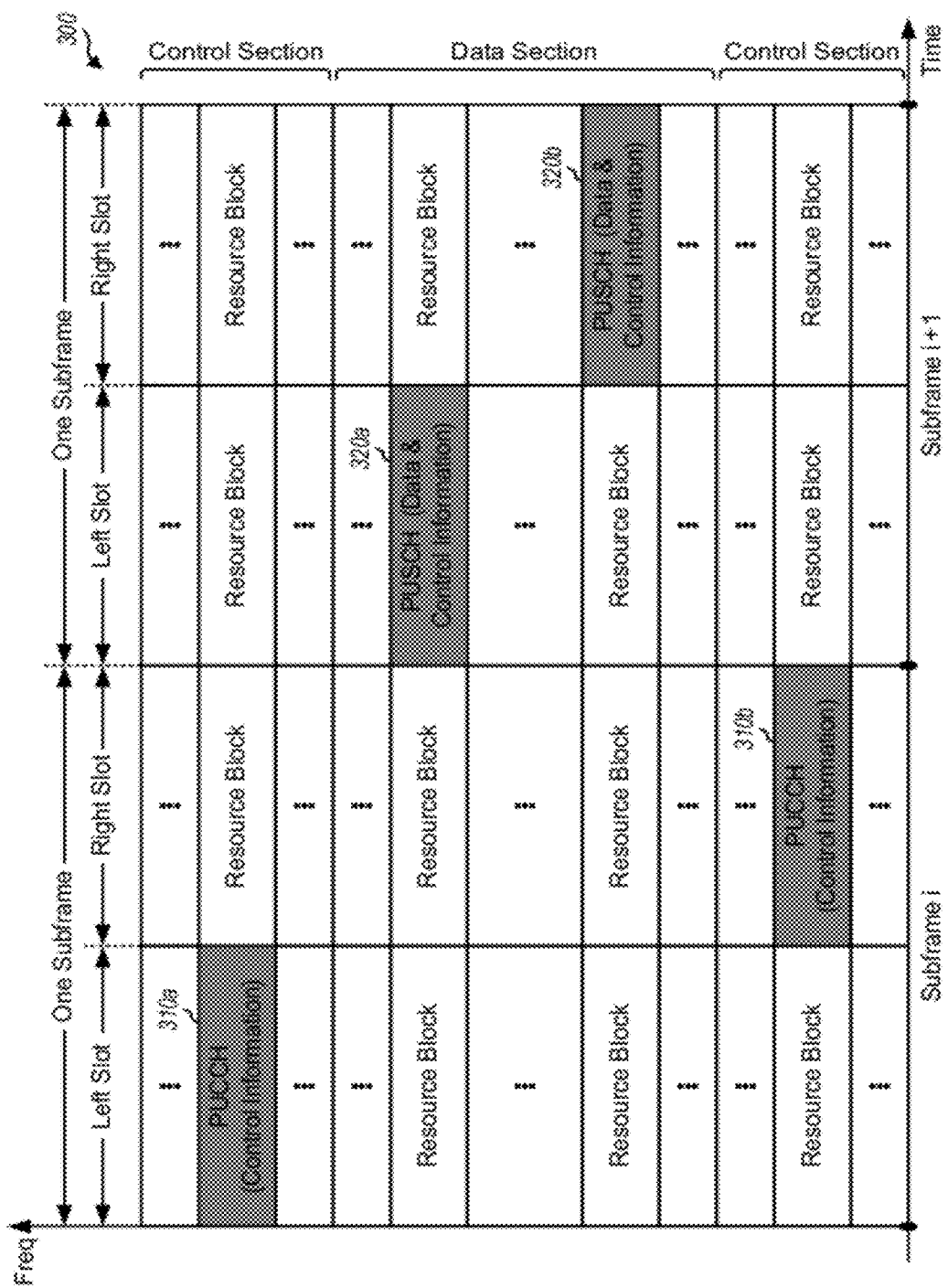
FIG. 3 is a block diagram conceptually illustrating an exemplary frame structure in uplink LTE/-A communications.

FIG. 3 is a block diagram conceptually illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Figure 4:
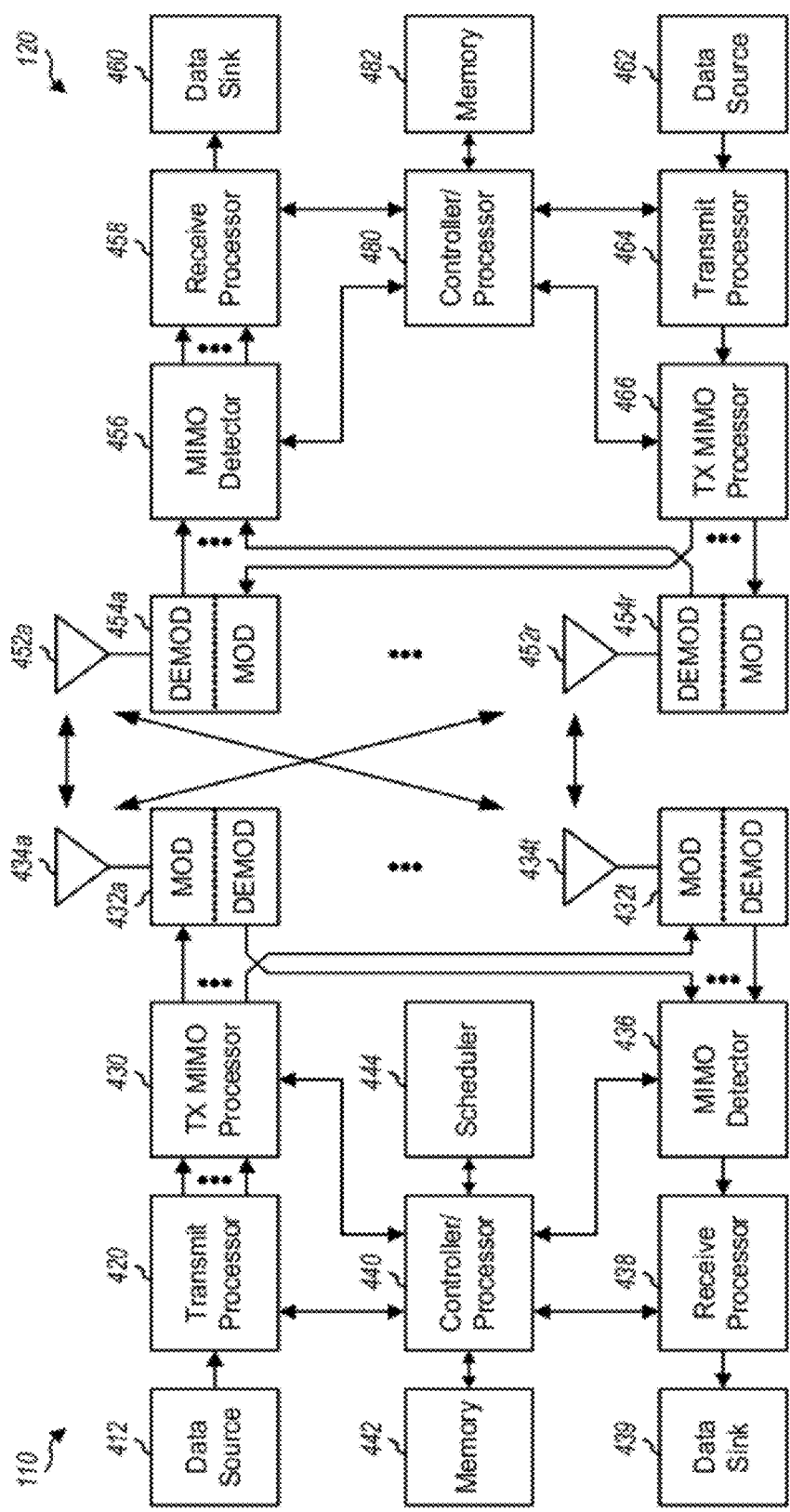
FIG. 4 is a block diagram conceptually illustrating a design of a base station/eNB and a UE configured according to one aspect of the present disclosure.

FIG. 4 shows a block diagram of a design of a base station/eNB 110 and a UE 120. The eNB 110 may be equipped with antennas 434a through 434t, and the UE 120 may be equipped with antennas 452a through 452r. At the eNB 110, a transmit processor 420 may receive data from a data source 412 and control information from a controller/processor 440. The transmit processor 420 may process (e.g., encode and symbol map) the data and control information to obtain data symbols and control symbols, respectively. The transmit processor 420 may also generate reference symbols and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the eNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data from a data source 462 and control information from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 110. At the eNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the eNB 110 and the UE 120, respectively. The controller/processor 440 and/or other processors and modules at the eNB 110 may perform or direct the execution of various processes for the techniques described herein. The controllers/processor 480 and/or other processors and modules at the UE 120 may also perform or direct the execution of the functional blocks illustrated in FIGS. 5-9, and/or other processes for the techniques described herein. The memories 442 and 482 may store data and program codes for the eNB 110 and the UE 120, respectively. A scheduler 444 may schedule UEs for data transmission on the downlink and/or uplink.

The Packet Data Convergence Protocol (PDCP) layer is one of the layers in the LTE radio interface user plane protocols. The PDCP layer is responsible for IP header compression to avoid unnecessary overhead in the payload. This layer is also responsible for ciphering and integrity protection check. The PDCP layer defines a data structure for ciphering/deciphering (also called encrypting/decrypting) packet data in radio transmissions to UE. In LTE, each data packet is ciphered and deciphered using a binary number, sometimes referred to as a "Count," structured as (HFN∥PDCP SN), wherein the Hyper-Frame Number (HFN) is a 20 bit binary number and PDCP sequence number (SN) is a 7-12 bit number. Therefore, Count in LTE is a binary value having between 27 and 32 bits, composited from the separate HFN and PDCP sequence number parts. The PDCP sequence number is initialized at the start of a transmission by the transmitting node and is incremented by one in each sequential packet of the transmission. Thus, after "N" number of packets, in which "N" is the maximum value of the PDCP sequence number, the PDCP sequence number "rolls over" (or is "rolled over") to its initial value. For example, if the initial PDCP sequence number value is 0000000, the sequence number rolls over when, in the packet immediately following a packet in which the PDCP sequence number is 1111111, the sequence number is again set to 0000000. A "rollover event" as used herein refers to sending or receiving a data packet in which the PDCP sequence number has rolled over to its initial value. A receiving node can detect a rollover event either by determining that the PDCP has been reset to its initial value, or in the event that one or more packets is lost in transmission, to some value less than the PDCP sequence number value in the last packet received.

The transmitting node may similarly set an initial value for the HFN or a default value may be used for each transmission. Thereafter, the source node and the receiving node independently maintain the current HFN value for the transmission, and increment the HFN in response to a PDCP sequence number rollover event. Thus, the HFN is independently incremented at a correlated frequency of "N" by the source and receiving devices, while the PDCP sequence number is incremented with each successive packet by the transmitting device. If synchronicity in the HFN between the source and receiving devices is lost, the correct value of Count cannot be recovered by the receiver, and therefore packet data cannot be correctly deciphered by the receiver while the receiver's deciphering failure is unknown to the transmitter. The user may experience the deciphering failure as a failure in transmission if the loss of synchronicity is not quickly repaired.

Under normal circumstances a mismatch between HFN at the source and receiver should be rare, because the receiver's robust detection capability for the PDCP sequence number rollover event ensures that false triggering events for incrementing the HFN should be very rare. However, an attacker might cause a false rollover event and break the HFN synchronicity between source and receiver, by transmitting a rogue data packet to the receiver. Such a break down may be very difficult for the sending device to detect, because it has no knowledge of the rogue packet.

Referring back to FIG. 1, the UE 120a and eNB 110 maintain synchronous HFN during packet communication. While the UE 120a is at the edge of coverage area 102, it may encounter interference from neighboring cells or noisy channels, such that packets transmitted from the eNB 110 may be lost. If a certain number of packets are lost, the next packet received by the UE 120a may include a sequence number of a next series of packets after a rollover has occurred at the eNB 110. However, as the last sequence number received by the UE 120a was before the rollover, the HFN at UE 120a will be different than the HFN at the eNB 110. Depending on the sequence number received by the UE 120a after the rollover, the UE 120a may not realize that there is a mismatch. For example, if the sequence number of the received packet is actually greater than the last-received sequence number. Thus, when calculating the Count for ciphering or deciphering packets, the wrong deciphering will result and communication will break down.

In another example, the UE 120b is in communication with the eNB 110. A rogue transmitter 130 disrupts communication with the UE 120b. The rogue transmitter 130 may transmit false data packets having incorrect sequence numbers and thus trigger the UE 120b and/or the eNB 110 to incorrectly detect a rollover and, thus, increment its HFN. Because the rollover was induced by malicious signals transmitted from the rogue transmitter 130, there will be an HFN mismatch, again, causing incorrect ciphering and deciphering because the Count will be incorrect.

To detect a break down and enable a recovery, the source and receiver may periodically perform a counter check. For example, the sending device may periodically request that the receiving device transmit its current HFN value to the sending device. If the HFN from the receiver does not match the HFN maintained by the sender, the sender may send a message to the receiver to reset the HFN to the correct value, thereby repairing the transmission. In the alternative, the sending device may release (i.e., terminate) the transmission to enable the source and receiver to reconnect using a new transmission.

The periodic approach to counter checking can cause an undesirably high frequency of HFN signaling between the source and receiver, if counter checking is performed frequently enough (e.g., about every 500 ms) to enable recovery from an attack or other loss of synchronicity by repairing or releasing a transmission. It would be desirable to reduce the frequency of signaling necessary to enable recovery from an attack or other loss of HFN synchronicity between the source and receiver, without compromising robustness of the transmission.

Within the LTE context, UE or the receiving node may be kept in sync with the HFN maintained by the eNB or sending node, while reducing the amount of signaling needed to keep both the sides in sync, using technology as disclosed herein. According to one aspect, the receiving node is configured to trigger a synchronization message, such as a signal message or PDCP control message, whenever HFN rollover is detected on a given radio bearer (DRB) at the receiver. The synchronization message will essentially contain information such as a "rbId" packet identifier on which HFN rollover happened and "new HFN" for this "rbId."

According to another aspect, the receiving node is configured to trigger a synchronization message whenever 'X' number of HFN rollovers are detected on a given radio bearer (DRB), where 'X' can be a static value or configured through a RRC configuration message, either per radio bearer or common value for all the radio bearers. This may be more useful for cases when the sequence number scope is small compared to transmission length (e.g., 7 bits), in that the scope causes a sequence number rollover to happen frequently during a transmission.

In addition, the transmitting node may be configured such that the transmitter does not generate RRC signaling/PDCP control message at all for HFN rollovers. Triggering of RRC signaling or the PDCP control message may be initiated exclusively from the receiving side.

To optimize efficiency or reduce the signaling further, the receiving node may be configured or implemented to generate a synchronization message, such as an HFN sync up signaling or a PDCP control message, only if the receiving node detects a PDCP sequence number rollover that includes a sequence number gap. The receiver may be configured to define a sequence number gap as any sequence number missing in the last 'n' protocol data units (PDUs, also called packets), where n can be 1 or 10 or other integer value which is configured through an RRC signaling message or statically defined in the specification. For example, if n is set to 1 and the UE receives a sequence number which results in a rollover, then, if the UE has not also received a packet assigned sequence number, SN-1, then, in response, the UE may transmit a synchronization message to trigger an HFN sync up procedure. If otherwise (the UE has received the sequence number), the UE does not transmit a synchronization message for the HFN sync up procedure. For further example, if n is set to 10 and if the UE receives a sequence number and this sequence number results in the rollover, then, if the UE has not received any of the sequence numbers from SN-10, SN-9, SN-8, . . . , SN-1, then, in response, the UE may transmit a synchronization message that triggers an HFN sync up procedure. If otherwise (the UE has received all of the last 'n' sequence numbers) the UE does not send the synchronization message for the HFN sync up procedure.

The sender node may respond to a synchronization message from a UE or receiver node by repairing or releasing a transmission. If the HFN of a given "rbId," indicated in the synchronization message from the receiving node, does not match with the HFN currently used by the transmitter side, the sender node may, for example, recover from an HFN mismatch scenario by making use of the HFN transmitted from the receiver node; e.g., setting its HFN value equal to the value received from the UE. In addition, the transmitter node may need to perform re-processing of certain packets, such as to update the HFNs for all the PDUs queued to RLC, and re-cipher any PDU's that have already been ciphered. In the alternative, the transmit node may be configured to release the call as un-recoverable if the HFN mismatch happens during a transmission in acknowledged mode (AM) DRB mode, or trigger a re-establishment or handover procedure if the mismatch occurs during a transmission in unacknowledged mode (UM) DRB mode.

The receiving node (UE or base station) initiated counter sync procedure may be performed using RRC-based signaling or PDCP level control signaling, in LTE. It should be appreciated that the event-triggered counter sync procedure may be initiated from a base station as well as a UE, and may be based on rollover of the PDCP sequence number or a rollover of the PDCP sequence number having an 'X' gap greater than one between the last received sequence number and the sequence number which resulted in or "triggered" the rollover detection.

In accordance with the foregoing, the technology provides certain features and advantages over the prior art, for example, it eliminates the need to send traditional counter check messages in both the directions to sync up HFNs. Counter check messages or synchronization message may instead be triggered in only one direction—from the UE to the base station—based on events defined by the base station. Counter checking or synchronization messages are generated in response to detection of the events, instead of periodically. These events may be set such that messages are not set by the UE at all or whenever PDCP sequence number is received which introduces a gap in the sequence number as well as results in a rollover. The disclosed technology enables error recovery without dropping/re-establishment of the transmission. The technology also eliminates the need for separate signaling for initiation of a counter check procedure. The technology also makes it possible to avoid or bypass RRC signaling completely by making use of PDCP control PDUs for the synchronization message to sync up HFN rollover scenarios, thereby preserving the RRC message exclusively for configuration use. The technology introduces a new PDCP control PDU type synchronization message which contains rbId and HFN combination and a new RRC signaling message for 'HFN or Counter sync up' instead of traditional Counter Check Procedure.

Figure 5:
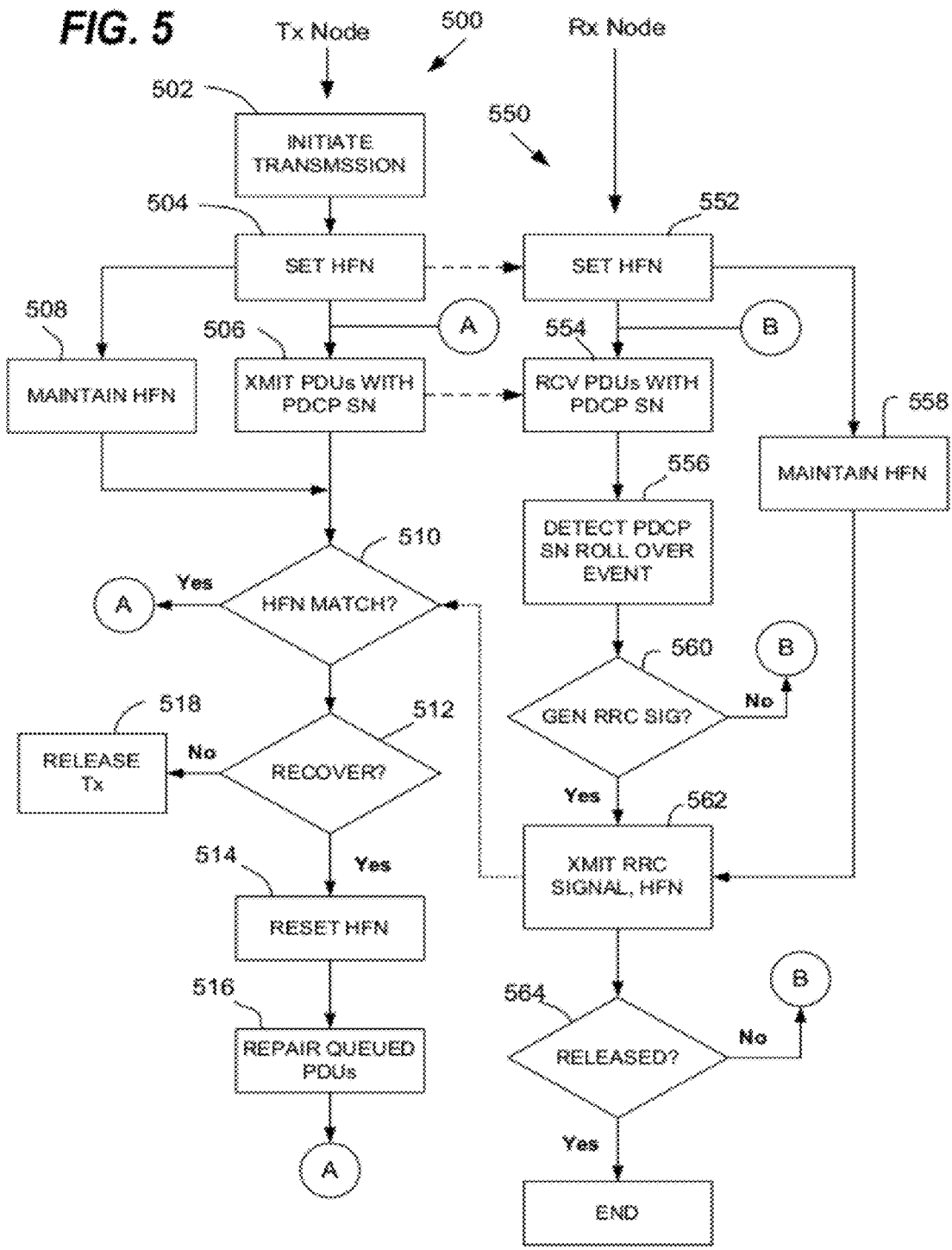
FIG. 5 is a flow chart showing aspects of an LTE counter check procedure triggered by a rollover detection event at the receiving node.

In accordance with one or more aspects of the embodiments described herein, there is provided a method for managing a transmission using a counter checking procedure that is initiated in response to a PDCP sequence number rollover event detected at the receiving node. FIG. 5 illustrates methodologies of elements 500, 550 respectively performed by a transmitting node and a receiving node, that manages a packetized transmission using a counter checking procedure for a ciper/decipher input, e.g., a Count. The procedure is initiated in response to a PDCP sequence number rollover event detected at the receiving node. Elements 500 relate to functions performed on the transmitting side, while elements 550 relate to functions performed on the receiving side.

At 502, a transmitting node initiates a packetized transmission to a receiving node in a manner appropriate for the governing protocol, for example, LTE. It should be appreciated that initializing a transmission may include an exchange of messages between the transmitting node and the receiving node as specified by the relevant protocol.

At 504, in parallel to 502, the transmitting node sets an HFN for the initial PDU according to the relevant protocol. The protocol may specify a defined HFN for all initial (first) PDUs in a transmission, in which case the initial value of the HFN is also known to the receiving node. If the initial HFN value is not known to the receiving node, the transmitting node may optionally transmit the HFN value in an RRC message or other control to the receiving node, prior to initial data transmission. The transmitting node may take a similar action with respect to the PDCP sequence number; that is, set an initial value which, if necessary, it may transmit to the receiving node. It should be appreciated that the initial PDCP sequence number value may be useful in detecting a rollover event. Therefore, the receiving node should be in possession of information about this value.

At 506, the transmitting node may transmit the data in PDUs sequenced according to the PDCP sequence number and ciphered using a "Count+key" composite as described hereinabove. Further details concerning PDU structure and transmission may be as specified by LTE. In parallel with 506, the transmitting node maintains 508 the HFN value in a memory at the transmitting side. The transmitting node changes (e.g., increments by one) the value of the HFN in a predetermined manner, in response to rollover of the PDCP sequence number as determined at the transmitting side.

At 510, the transmitting node receives an HFN value transmitted from the receiving node, for example, an HFN value encoded in an RRC signal or PDCP level control signal. The transmitting node responds to the received HFN value by comparing it to the HFN value maintained in the transmitter memory. In addition, the transmitting node may receive the value of the PDCP sequence number for the packet that triggered the detection of a rollover event at the receiving node.

If the received HFN matches the HFN maintained in transmitter memory, then the transmitter may resume transmission of PDUs at 506 without taking other action. If the received HFN does not equal the HFN maintained in transmitter memory (an HFN mismatch exists), the transmitter, in response to detecting the mismatch, may determine 512 whether to repair or release ("terminate") the transmission. The transmitter node may use any useful transmission parameters in making this determination. In general, if it is possible to repair and thereby recover the transmission the transmitting node may prefer to do so. If it is not possible to recover the transmission, for example, if poor signal quality is causing too many HFN mismatches or if the PDU queue is too large, the transmitting node may release the call 518, terminating the transmission.

If the transmitting node determines it will recover the transmission, it may momentarily cease PDU transmission and reset the HFN value 514 maintained at the transmitting node to the value received from the receiving node. In addition, the transmitting node may also reset the PDCP sequence number to the value received from the receiving node for the triggering PDU, plus one. The transmitting node then resets Count in accordance with the corrected HFN and sequence number. The transmitting node may take further actions to repair any queued PDUs 514 after resetting the Count. For example, the transmitting node may recover data from the queued PDU's, delete the queued PDU's, and generate a replacement queue of PDUs with data ciphered using the new Count and sequenced according to the new PDCP sequence number. The transmitting node may then resume transmission 506.

It should be appreciated that, instead of resetting the transmitter-side HFN value to the HFN value from the receiving node, the transmitting node may instruct the receiving node to reset its HFN to the value maintained at the transmitting side. This requires sending a return RRC signal containing the HFN value (and optionally, the current PDCP sequence number for the incipient queued PDU at the transmitter) to the receiving node, which may not be desirable. However, thus providing the receiving side with the Count may provide the advantage of avoiding the need to repair the transmission PDU queue.

FIG. 5 also shows elements 550 performed by the receiving node in coordination with elements 500 performed by the transmitting node. At 552, the receiving node sets an initial HFN value for a transmission, which it will independently maintain 558 at the receiving node to determine Count and decipher incoming PDU data belonging to the transmission. At 554, the receiving node receives and deciphers a sequence of PDUs each including a PDCP sequence number in a PDCP layer. The receiving node tracks the PDCP sequence number sequence, for example by comparing the sequence number for the most recent packet to the sequence number for the prior packet. In LTE, the PDCP sequence number is incremented by one for each packet, but is should be appreciated that any other rational scheme for sequencing a number series may be used, for example, incrementing by two or decrementing by one. In an increment-by-one scheme, the receiving node may detect a rollover event 556 by determining that the most recent PDCP sequence number is less than the PDCP sequence number for the preceding packet, for example when 1111111 ('$A_1$') rolls over to 0000000 ('$A_2$'), $A_2<A_1$. A rollover may also be detected without a smooth transition in PDCP sequence numbers. For example, due to poor reception, several packets may be lost in transmission. Therefore, consecutive sequence numbers 1111101 ('$B_1$') and 0000100 ('$B_2$'), where $B_2<B_1$, also indicates a rollover event. The state $B_2<B_1$, indicating some integral number of dropped packets, and may be considered as more likely to indicate an error in HFN incrementing. In either case, the receiving node increments HFN in response to a rollover event, in accordance with the applicable protocol.

At 560, the receiving node determines whether or not to generate an RRC message or PDCP level control message to the transmitting node, containing the receiving node's HFN value, in response to a rollover event. This determination may be made by the receiving node depending on the number of dropped packets indicated by the rollover event. For example, if the number of dropped packets is greater than 'N', where N is zero or any defined positive integer, then the receiving node may transmit 562 the RRC signal to the transmitting node, containing the receiving node's HFN value and optionally an identifier for the PDCP sequence number that triggered the rollover event. The receiving node may hold N static according to a stored non-volatile value, or vary N in response to signal conditions or instructions from the transmitting node.

If the received HFN matches the HFN maintained in transmitter memory, then the transmitter may resume transmission of PDUs at 506 without taking other action. If the received HFN does not equal the HFN maintained in transmitter memory (an HFN mismatch exists), the transmitter, in response to detecting the mismatch, may determine 512 whether to repair or release ("terminate") the transmission. The transmitter node may use any useful transmission parameters in making this determination. In general, if it is possible to repair and thereby recover the transmission the transmitting node may prefer to do so. If it is not possible to recover the transmission, for example, if poor signal quality is causing too many HFN mismatches or if the PDU queue is too large, the transmitting node may release the connection 518, terminating the transmission.

If the transmitting node determines it will recover the transmission, it may momentarily cease PDU transmission and reset the HFN value 514 maintained at the transmitting node to the value received from the receiving node. In addition, the transmitting node may also reset the PDCP sequence number to the value received from the receiving node for the triggering PDU, plus one. The transmitting node then resets Count in accordance with the corrected HFN and sequence number. The transmitting node may take further actions to repair any queued PDUs 514 after resetting the Count. For example, the transmitting node may recover data from the queued PDU's, delete the queued PDU's, and generate a replacement queue of PDUs with data ciphered using the new Count and sequenced according to the new PDCP sequence number. The transmitting node may then resume transmission 506.

It should be appreciated that, instead of resetting the transmitter-side HFN value to the HFN value from the receiving node, the transmitting node may instruct the receiving node to reset its HFN to the value maintained at the transmitting side. This requires sending a return RRC signal containing the HFN value (and optionally, the current PDCP sequence number for the incipient queued PDU at the transmitter) to the receiving node, which may not be desirable. However, thus providing the receiving side with the Count may provide the advantage of avoiding the need to repair the transmission PDU queue.

FIG. 5 also shows elements 550 performed by the receiving node in coordination with elements 500 performed by the transmitting node. At 552, the receiving node sets an initial HFN value for a transmission, which it will independently maintain 558 at the receiving node to determine Count and decipher incoming PDU data belonging to the transmission. At 554, the receiving node receives and deciphers a sequence of PDUs each including a PDCP sequence number in a PDCP layer. The receiving node tracks the PDCP sequence number sequence, for example by comparing the sequence number for the most recent packet to the sequence number for the prior packet. In LTE, the PDCP sequence number is incremented by one for each packet, but is should be appreciated that any other rational scheme for sequencing a number series may be used, for example, incrementing by two or decrementing by one. In an increment-by-one scheme, the receiving node may detect a rollover event 556 by determining that the most recent PDCP sequence number is less than the PDCP sequence number for the preceding packet, for example, when 1111111 ('$A_1$') rolls over to 0000000 ('$A_2$'), $A_2<A_1$. To give a further example, when 1111101 ('$B_1$') rolls over to 0000100 ('$B_2$'), $B_2<B_1$, and, therefore, this state also indicates a rollover event. However, it should be noted that the state $A_2<A_1$ indicates no dropped packets, while the latter state $B_2<B_1$ indicates some integral number of dropped packets, and, therefore, may be considered as more likely to indicate an error in HFN incrementing. In either case, the receiving node increments HFN in response to a rollover event, in accordance with the applicable protocol.

If the receiving node's RRC transmission does not cause the call to be released by the transmitting node at 564, then the receiving node may continue receiving packets 554 and deciphering the data using its Count, otherwise the call will be released ending the call. Repair of the PDUs may be handled at the transmitting node. In response to instructions (if any) from the transmitting node, the receiving node may reset its own stored HFN value and resume deciphering using the reset HFN value to compute Count.

Figure 6:
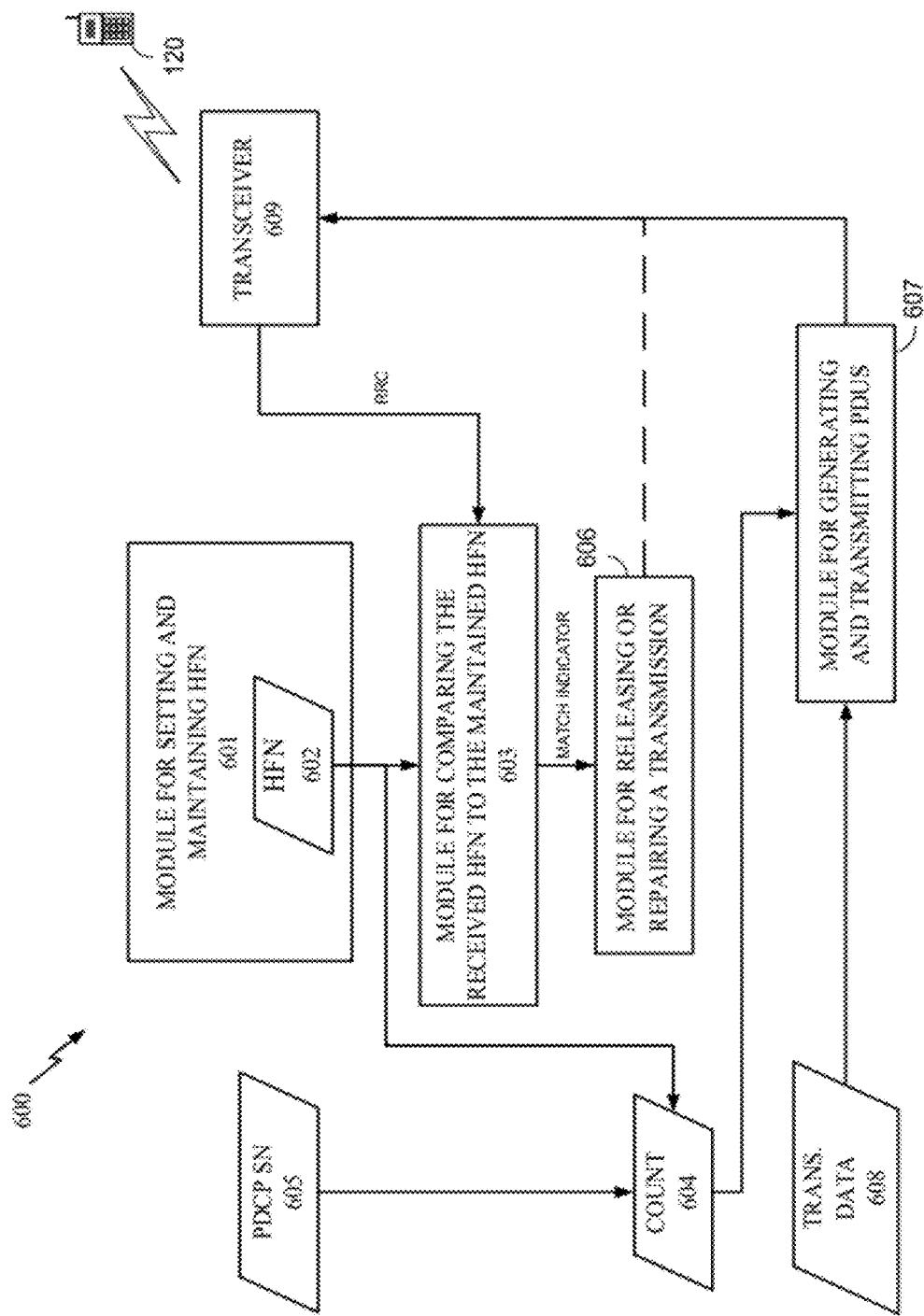
FIG. 6 is a functional block diagram showing aspects of a transmitter node for performing an LTE counter check procedure triggered by a rollover detection event at the receiving node.

In accordance with one or more aspects of the embodiments described herein, there are provided devices and apparatuses for managing Count at a transmitting node in response to a signal from a receiving node. FIG. 6 is a block diagram illustrating a transmitting device 600 configured according to one aspect of the present disclosure. The transmitting device 600 executes a module 601 for setting and maintaining HFN 602. The transmitting device 600 operates a module 607 for generating and transmitting PDUs by ciphering transmission data 608. The transmission data 608 is ciphered using count 604, which is made up from HFN 602 and a PDCP SN 605. Count 604 is input into module 607 after which the PDUs are transmitted to UE 120 through a transceiver 609.

The transceiver 609 receives an RRC message from UE 120. The RRC message is input into a module 603 operated by the transmitting device 600 for comparing a received HFN, from the RRC message, to the HFN 602. The module 603 outputs a match indicator to a module 606 operated by the transmitting device 600 for releasing or repairing a transmission. When the match indicator indicates that the received HFN does not match the HFN 602 maintained by the transmitting device 600, the module 606 determines whether the connection will be released or repaired. In selected embodiments, if the module 607 had already ciphered several PDUs for transmission, the module 606 may determine to release the connection because the transmitting device 600 would need to re-cipher all of the PDUs waiting for transmission. Otherwise, the module 606 may determine to repair the connection by, for example, replacing the HFN 602 with the received HFN.

Figure 7:
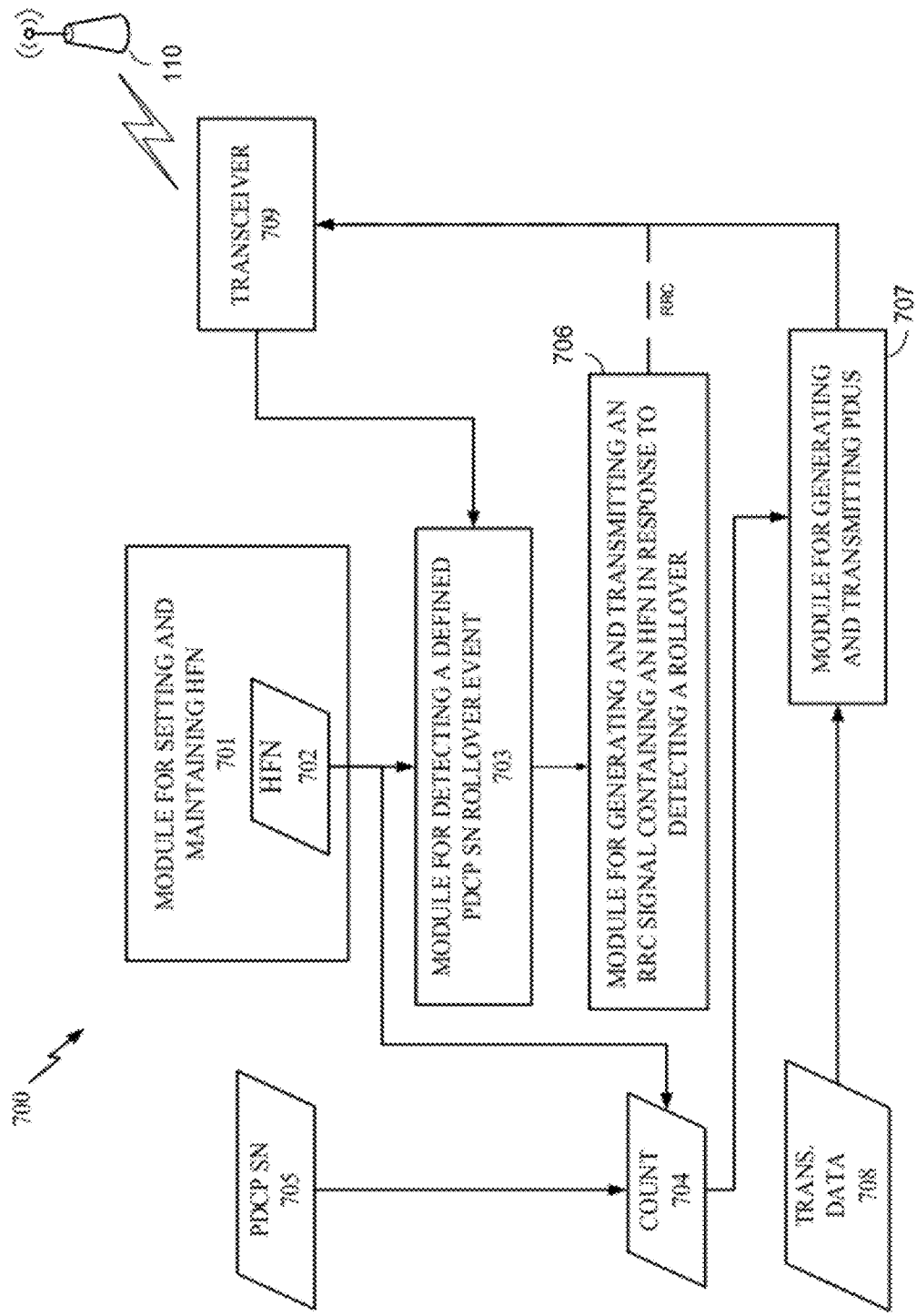
FIG. 7 is a functional block diagram showing aspects of a receiving node for detecting a rollover event and signaling the transmitter to enable an LTE counter check procedure.

FIG. 7 is a block diagram illustrating a receiving device 700 configured according to one aspect of the present disclosure. The receiving device 700 executes a module 701 for setting and maintaining an HFN 702. The receiving device 700 operates a module 707 for generating and transmitting PDUs by ciphering transmission data 708. The transmission data 708 is ciphered using count 704, which is made up from HFN 702 and a PDCP SN 705. Count 704 is input into module 707 after which the PDUs are transmitted to an eNB 110 through a transceiver 709.

As the receiving device 700 receives data packets from eNB 110 via the transceiver 709, a module 703 for detecting a defined PDCP SN rollover event monitors the received PDCP SN from the received data packet. The module 703 compares the received PDCP SN with PDCP SN 705 from the previous received packet. If a rollover event is detected by module 703, the receiving device 700 increments the HFN 702 and operates module 706 for generating and transmitting an RRC signal containing the incremented HFN 702. The RRC signal is transmitted to the eNB 110 through the transceiver 709. The RRC signal will allow the eNB 110 to verify the synchronization of HFN.

FIG. 8 is a functional block diagram illustrating example blocks executed to implement one aspect of the present disclosure. In block 800, received data packets are monitored. For example, in the case of a UE receiving device, signals are received on the antennas 452a-452r, demodulated with the demodulators 454a-454r, and spatially assembled with the MIMO detector 456. The receive processor 458 then decodes the signals into the received data packets. The controller/processor 480 examines the sequence number of the received packets. In the case of an eNB receiving device, signals are received on the antennas 434a-434r, demodulated with the demodulators 432a-432r, and spatially assembled with the MIMO detector 436. The receive processor 438 then decodes the signals into the received data packets. The controller/processor 440 examines the sequence number of the received packets.

A determination is made, in block 801, whether a rollover has occurred with the data packet sequence number. In the case of a UE receiving device, the controller/processor 480 compares the received sequence number against the current sequence number stored in memory 482. For the eNB receiving device, the controller/processor 440 compares the received sequence number against the current sequence number stored in memory 442. If the received sequence number is less than the stored sequence number, then the receiving device identifies that there has been a rollover. If no rollover is identified, then the receiving device continues to monitor received data packets in block 800. Otherwise, if a rollover is detected, then, in block 802, a variable data portion of a deciphering key stored in a memory of the receiving device is incremented. The deciphering key is a combination of the variable data portion and the packet data sequence number. For a UE receiving device, the controller/processor 480 increments the variable data portion of the deciphering key stored in memory 482. With an eNB receiving device, the controller/processor 440 increments the variable data portion of the deciphering key stored in memory 442.

In block 803, a synchronization message is transmitted from the receiving device to a source device. With the UE receiving device, the controller/processor 480 generates the synchronization message and passes the generated message to the transmit processor 464 for encoding, after which the transmit MIMO processor 466 performs spatial processing on the encoded message. The encoded message is then modulated by modulators 454a-454r and transmitted through antennas 452a-452r. In the instance of an eNB receiving device, the controller/processor 440 generates the synchronization message and passes the generated message to the transmit processor 420 for encoding, after which the transmit MIMO processor 430 performs spatial processing on the encoded message. The encoded message is then modulated by modulators 432a-432r and transmitted through antennas 434a-434r.

In one configuration, depending on which communication entity is the receiving device, the UE 120 or eNB 110 configured for wireless communication includes means for detecting a rollover of a packet data sequence number in successive data packets of a transmission received by a receiving device, means for incrementing, in response to the rollover, a variable data portion of a deciphering key stored in a memory of the receiving device, wherein the deciphering key comprises the variable data portion and the packet data sequence number, and means for transmitting a synchronization message from the receiving device to a source device. In one aspect, in which the UE 120 is the receiving device, the aforementioned means may be the processor(s), the controller/processor 480, the memory 482, the receive processor 458, the MIMO detector 456, the demodulators 454a, and the antennas 452a configured to perform the functions recited by the aforementioned means. In another aspect, in which the eNB 110 is the receiving device, the aforementioned means may be the processor(s), the controller/processor 440, the memory 442, the receive processor 438, the MIMO detector 436, the demodulators 432a, and the antennas 434a configured to perform the functions recited by the aforementioned means. In other aspects, the aforementioned means may be a module or any apparatus configured to perform the functions recited by the aforementioned means.

FIG. 9 is a functional block diagram illustrating example blocks executed to implement one aspect of the present disclosure. In block 900, signals received on antennas of the receiving device are decoded into received data packets. For example, in the case of a UE receiving device, signals are received on the antennas 452a-452r, demodulated with the demodulators 454a-454r, and spatially assembled with the MIMO detector 456. The receive processor 458 then decodes the signals into the received data packets. In the case of an eNB receiving device, signals are received on the antennas 434a-434r, demodulated with the demodulators 432a-432r, and spatially assembled with the MIMO detector 436. The receive processor 438 then decodes the signals into the received data packets.

In block 901, the received packet sequence number is extracted from one of the received data packets. In the case of a UE receiving device, the controller/processor 480 accesses the packet sequence number in the data packet header. For eNB receiving devices, the controller/processor 440 would access the packet sequence number in the data packet header.

The received sequence number is compared to a stored sequence number stored on a memory of the receiving device in block 902. In UE receiving devices, the controller/processor 480 examines the sequence number of the received packets and compares the received sequence number against the current sequence number stored in memory 482. For the eNB receiving device, the controller/processor 440 compares the received sequence number against the current sequence number stored in memory 442. In block 903, a rollover when the received sequence number is less than the stored sequence number.

In block 904, the decipher key is accessed from memory and the variable data portion of the decipher key is incremented in response to the identified rollover. For a UE receiving device, the controller/processor 480 increments the variable data portion of the deciphering key stored in memory 482. With an eNB receiving device, the controller/processor 440 increments the variable data portion of the deciphering key stored in memory 442.

In block 905, a synchronization message is generated in response to the identified rollover. With the UE receiving device, the controller/processor 480 generates the synchronization message. In the instance of an eNB receiving device, the controller/processor 440 generates the synchronization message. The synchronization message is encoded and modulated for transmission, in block 906, to transmitting device. For the UE receiving device, the controller/processor 480 passes the generated message to the transmit processor 464 for encoding, after which the transmit MIMO processor 466 performs spatial processing on the encoded message. The encoded message is then modulated by modulators 454a-454r and transmitted through antennas 452a-452r. For the eNB receiving device, the controller/processor 440 passes the generated message to the transmit processor 420 for encoding, after which the transmit MIMO processor 430 performs spatial processing on the encoded message. The encoded message is then modulated by modulators 432a-432r and transmitted through antennas 434a-434r.

Figure 10:
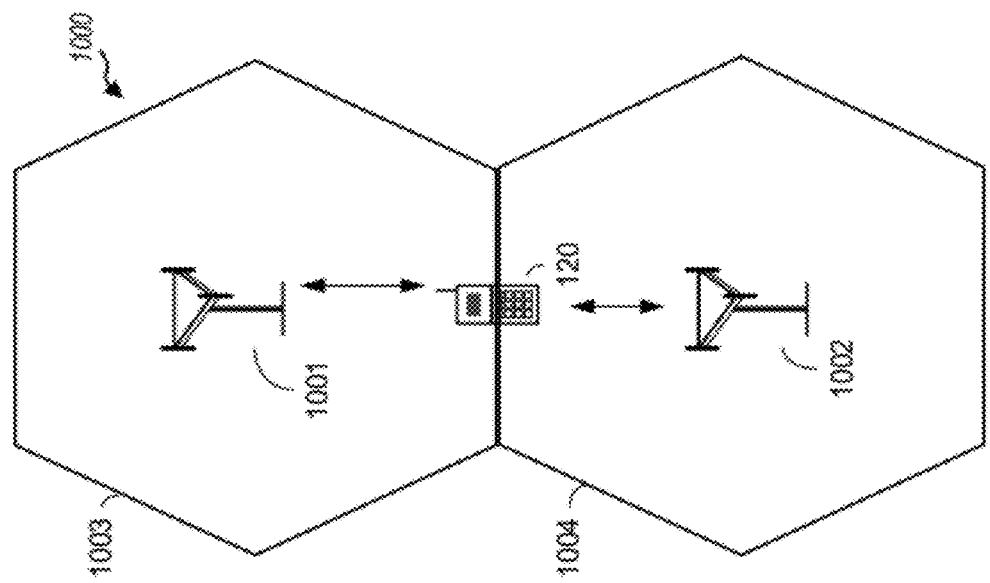
FIG. 10 is a block diagram illustrating a communication network configured according to one aspect of the present disclosure.

In LTE UM mode, a PDCP sequence number rollover event may happen as part of handover or re-establishment procedure. FIG. 10 is a block diagram illustrating a communication network 1000 configured according to one aspect of the present disclosure. A UE 120 is served by eNB 1001 within coverage area 1003. As the UE 120 moves in the direction of coverage area 1004, served by eNB 1002, handover procedures begin to switch communications between the source base station, eNB 1001, and the target base station, eNB 1002. When the handover is complete, an RRC configuration complete message is transmitted from the UE 120. In one scenario, the sequence number which resulted in a rollover event is received in-sequence with the LAST_PDCP_SN submitted to upper layers. That is, the sequence number is delivered to upper layers immediately. In this scenario, the synchronization message is generated at the receiver in response to delivery of the rollover sequence number to upper layers. If an RRC synchronization message needs to be generated before the RRC configuration complete message moves out of the UE 120, then the RRC may hold this generated synchronization message and let the configuration complete message be queued to lower layers first and after that queue the synchronization message.

In another scenario also referenced in FIG. 10, the sequence number which resulted in HFN rollover is not in sequence with the LAST_PDCP_SN submitted to upper layers. That is, it will not be delivered to upper layers immediately but will sit in the PDCP re-ordering window of the UE 120. If there is no problem caused by transmitting a synchronization message before configuration complete then the UE 120 may queue the sync up message regardless of whether the RRC configuration complete message is queued.

It should be noted that a synchronization message, such as an RRC HFN sync up message PDU or HFN sync up PDCP control PDU, should not be generated for UM mode RBs during handover or re-establishment, because HFN will be reset for UM mode RBs. That is, a synchronization message does not need to be generated by the UE 120, except for AM mode DRBs. If the UE 120 fails to transmit a synchronization message, then the RRC may retransmit the synchronization message after re-establishment or handover.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   detecting a rollover of a packet data sequence number in successive data packets of a transmission received by a receiving device;
   incrementing, in response to said rollover, a variable data portion of a deciphering key stored in a memory of said receiving device, wherein said deciphering key comprises said variable data portion and said packet data sequence number;
   transmitting a synchronization message from said receiving device to a source device;
   comparing said variable data portion of said deciphering key with a transmitter variable data portion of a transmitter deciphering key received from a transmitting device; and
   in response to said variable data portion being different from said transmitter variable data portion, determining an amount of re-processing to be performed to reset said variable data portion to said transmitter variable data portion;
   in response to said amount of re-processing not exceeding a predetermined amount, resetting said variable data portion to said transmitter variable data portion; and
   in response to said amount of re-processing exceeding the predetermined amount, releasing a connection between said receiving device and said transmitting device.

2. The method of claim 1 performed during a handover, said method further comprising:
   determining said rollover packet data sequence number is delivered out of sequence with a last packet data sequence number submitted to upper layers;
   placing said rollover packet data sequence number into a reordering queue; and
   in response to said determining, performing said transmitting said synchronization message when said rollover data sequence number is transmitted to said upper layers after reordering.

3. A receiving device, comprising:
   means for detecting a rollover of a packet data sequence number in successive data packets of a transmission received by said receiving device;
   means for incrementing, in response to said rollover, a variable data portion of a deciphering key stored in a memory of said receiving device, wherein said deciphering key comprises said variable data portion and said packet data sequence number;
   means for transmitting a synchronization message from said receiving device to a source device;
   means for comparing said variable data portion of said deciphering key with a transmitter variable data portion of a transmitter deciphering key received from a transmitting device; and
   means for determining, in response to said variable data portion being different from said transmitter variable data portion, an amount of re-processing to be performed to reset said variable data portion to said transmitter variable data portion;
       means for resetting, in response to said amount of re-processing not exceeding a predetermined amount, said variable data portion to said transmitter variable data portion; and
       means for releasing, in response to said amount of re-processing exceeding the predetermined amount, a connection between said receiving device and said transmitting device.

4. The receiving device of claim 3 performed during a handover, said receiving device further comprising:
   means for determining said rollover packet data sequence number is delivered out of sequence with a last packet data sequence number submitted to upper layers;
   means for placing said rollover packet data sequence number into a reordering queue; and
   means, executable in response to said means for determining, for performing said means for transmitting said synchronization message when said rollover data sequence number is transmitted to said upper layers after reordering.

5. A computer program product for wireless communications stored on a non-transitory computer-readable medium and comprising code for performing the steps of
   detecting a rollover of a packet data sequence number in successive data packets of a transmission received by a receiving device;
   incrementing, in response to said rollover, a variable data portion of a deciphering key stored in a memory of said receiving device, wherein said deciphering key comprises said variable data portion and said packet data sequence number;
   transmitting a synchronization message from said receiving device to a source device;
   comparing said variable data portion of said deciphering key with a transmitter variable data portion of a transmitter deciphering key received from a transmitting device; and determining, in response to said variable data portion being different from said transmitter variable data portion, an amount of re-processing to be performed to reset said variable data portion to said transmitter variable data portion;

resetting, in response to said amount of re-processing not exceeding a predetermined amount, said variable data portion to said transmitter variable data portion; and releasing, in response to said amount of re-processing exceeding the predetermined amount, a connection between said receiving device and said transmitting device.

6. The computer program product of claim 5 executed during a handover, wherein said non-transitory computer-readable medium further comprises code for performing the step of:

determining said rollover packet data sequence number is delivered out of sequence with a last packet data sequence number submitted to upper layers;

placing said rollover packet data sequence number into a reordering queue; and executing, in response to the determining said rollover packet data sequence number is delivered out of sequence, said code for performing the step of transmitting said synchronization message when said rollover data sequence number is transmitted to said upper layers after reordering.

7. A receiving device configured for wireless communication, said receiving device comprising
at least one processor; and
a memory coupled to said at least one processor,
wherein said at least one processor is configured:
to detect a rollover of a packet data sequence number in successive data packets of a transmission received by a receiving device;
to increment, in response to said rollover, a variable data portion of a deciphering key stored in a memory of said receiving device, wherein said deciphering key comprises said variable data portion and said packet data sequence number;
to transmit a synchronization message from said receiving device to a source device;
to compare said variable data portion of said deciphering key with a transmitter variable data portion of a transmitter deciphering key received from a transmitting device; and
to determine, in response to said variable data portion being different from said transmitter variable data portion, an amount of re-processing to be performed to reset said variable data portion to said transmitter variable data portion;
to reset, in response to said amount of re-processing not exceeding a predetermined amount, said variable data portion to said transmitter variable data portion; and
to release, in response to said amount of re-processing exceeding the predetermined amount, a connection between said receiving device and said transmitting device.

8. The receiving device of claim 7 performed during a handover, wherein said at least one processor is further configured:
to determine said rollover packet data sequence number is delivered out of sequence with a last packet data sequence number submitted to upper layers;
to place said rollover packet data sequence number into a reordering queue; and to transmit said synchronization message when said rollover data sequence number is transmitted to said upper layers after reordering in response to said at least one processor configured to determine.

9. The method of claim 1 further comprising:
identifying, by said receiving device, a mismatch event defined by a sequence gap between said rollover packet data sequence number and at least one packet data sequence numbers of previously received data packets, wherein said transmitting said synchronization message is in response to said identified mismatch event.

10. The method of claim 9 wherein said mismatch event is defined by a sequence gap comprising one of:
a single missing packet data sequence number between said successive data packets; and
a plurality of missing packet data sequence numbers between said rollover packet data sequence number and at least two packet data sequence numbers of said previously received data packets.

11. The method of claim 1 further comprising:
detecting at least one additional rollovers of at least one additional packet data sequence numbers in additional successive data packets of said transmission, wherein said transmitting said synchronization message is in response to detecting a predetermined number of rollovers.

12. The method of claim 11 wherein said transmitting said synchronization message is further in response to detecting a predetermined number of rollovers within a predetermined period of time.

13. The receiving device of claim 3 further comprising:
means for identifying, by said receiving device, a mismatch event defined by a sequence gap between said rollover packet data sequence number and at least one packet data sequence numbers of previously received data packets, wherein said means for transmitting said synchronization message is in response to said identified mismatch event.

14. The receiving device of claim 13 wherein said mismatch event is defined by a sequence gap comprising one of:
a single missing packet data sequence number between said successive data packets; and
a plurality of missing packet data sequence numbers between said rollover packet data sequence number and at least two packet data sequence numbers of said previously received data packets.

15. The receiving device of claim 3 further comprising:
means for detecting at least one additional rollovers of at least one additional packet data sequence numbers in additional successive data packets of said transmission, wherein said means for transmitting said synchronization message is in response to detecting a predetermined number of rollovers.

16. The receiving device of claim 15 wherein said means for transmitting said synchronization message is further in response to detecting a predetermined number of rollovers within a predetermined period of time.

17. The computer program product of claim 5, wherein said non-transitory computer-readable medium further comprises code for performing the step of:
identifying, by said receiving device, a mismatch event defined by a sequence gap between said rollover packet data sequence number and at least one packet data sequence numbers of previously received data packets, wherein said code for performing the step of transmitting said synchronization message is executed in response to said code for performing the step of identifying the mismatch event.

18. The computer program product of claim 17 wherein said mismatch event is defined by a sequence gap comprising one of:
   a single missing packet data sequence number between said successive data packets; and
   a plurality of missing packet data sequence numbers between said rollover packet data sequence number and at least two packet data sequence numbers of said previously received data packets.

19. The computer program product of claim 5, wherein said non-transitory computer-readable medium further comprises code for performing the step of:
   detecting at least one additional rollovers of at least one additional packet data sequence numbers in additional successive data packets of said transmission, wherein said code for performing the step of transmitting said synchronization message is executed in response to said code for performing the step of detecting a predetermined number of rollovers.

20. The computer program product of claim 19 wherein said code for performing the step of transmitting said synchronization message is further executed in response to said code for performing the step of detecting a predetermined number of rollovers within a predetermined period of time.

21. The receiving device of claim 7 wherein said at least one processor is further configured:
   to identify, by said receiving device, a mismatch event defined by a sequence gap between said rollover packet data sequence number and at least one packet data sequence numbers of previously received data packets, wherein said at least one processor configured to transmit said synchronization message is configured to transmit in response to said identified mismatch event.

22. The receiving device of claim 21 wherein said mismatch event is defined by a sequence gap comprising one of:
   a single missing packet data sequence number between said successive data packets; and
   a plurality of missing packet data sequence numbers between said rollover packet data sequence number and at least two packet data sequence numbers of said previously received data packets.

23. The receiving device of claim 7 wherein said at least one processor is further configured:
   to detect at least one additional rollovers of at least one additional packet data sequence numbers in additional successive data packets of said transmission, wherein said at least one processor configured to transmit said synchronization message is configured to transmit in response to detecting a predetermined number of rollovers.

24. The receiving device of claim 23 wherein said at least one processor configured to transmit said synchronization message is further configured to transmit in response to detecting a predetermined number of rollovers within a predetermined period of time.

* * * * *